United States Patent
Heidger

(10) Patent No.: US 12,131,651 B2
(45) Date of Patent: Oct. 29, 2024

(54) AIR POSITION INFORMATION AND TRAFFIC MANAGEMENT SYSTEM FOR UNMANNED AND MANNED AIRCRAFT

(71) Applicant: DFS Deutsche Flugsicherung GmbH, Langen (DE)

(72) Inventor: Ralf Heidger, Wiesbaden (DE)

(73) Assignee: DFS Deutsche Flugischerung GmbH, Langen (DE)

( * ) Notice: Subject to any disclaimer, the term of this patent is extended or adjusted under 35 U.S.C. 154(b) by 927 days.

(21) Appl. No.: 16/978,353

(22) PCT Filed: Mar. 5, 2019

(86) PCT No.: PCT/EP2019/055407
§ 371 (c)(1),
(2) Date: Sep. 4, 2020

(87) PCT Pub. No.: WO2019/170649
PCT Pub. Date: Sep. 12, 2019

(65) Prior Publication Data
US 2021/0043094 A1    Feb. 11, 2021

(30) Foreign Application Priority Data
Mar. 6, 2018   (DE) ..................... 10 2018 105 045.3

(51) Int. Cl.
*G08G 5/00*   (2006.01)
*G01S 7/00*   (2006.01)
*G01S 13/91*  (2006.01)

(52) U.S. Cl.
CPC ............ *G08G 5/0026* (2013.01); *G01S 7/003* (2013.01); *G01S 13/91* (2013.01); *G08G 5/0013* (2013.01); *G08G 5/0082* (2013.01)

(58) Field of Classification Search
CPC .. G08G 5/0026; G08G 5/0013; G08G 5/0082; G01S 7/003; G01S 13/91
See application file for complete search history.

(56) References Cited

U.S. PATENT DOCUMENTS

| 8,792,905 | B1 | 7/2014 | Li et al. |
| 10,302,759 | B1* | 5/2019 | Arteaga ............... G08G 5/0082 |

(Continued)

FOREIGN PATENT DOCUMENTS

| DE | 19826737 A1 | 12/1999 |
| EP | 2138921 A1 | 12/2009 |

(Continued)

OTHER PUBLICATIONS

International Search Report for PCT/EP2019/055407, mailed Jun. 21, 2019.

(Continued)

*Primary Examiner* — Peter M Bythrow
*Assistant Examiner* — Nazra Nur Waheed
(74) *Attorney, Agent, or Firm* — The Roy Gross Law Firm, LLC; Roy Gross

(57) ABSTRACT

The invention describes an air position information and traffic management system for unmanned and manned aircraft, in which the position data (20) of aircraft that are detectable by ATM sensors (2) are detected, tracked, and represented in an air position image (5) by means of ATM sensors (2) of the air position information and traffic management system (1). Also provided in the data network (3) is a tracking device (4) that is configured to track the detected position data (20) and prepare the data as an air position image (5), so that the air position image (5) may be represented on a display device (6, 18, 19) that is connectable to the data network (3). Furthermore, aircraft that are not detectable by means of ATM sensors (2) are equipped (Continued)

with portable position sensor devices (10, 11, 12) of the air position information and traffic management system (1), the portable position sensor devices (10, 11, 12) being configured to detect current position data (20), to communicate, by means of a radio communication device, with a ground station (14) connected to the data network (3), and to upload the position data (20) into the data network (3) so that a complete air position image (5) may be represented on a display device (6, 18, 19) that is connectable to the data network (3).

14 Claims, 3 Drawing Sheets

(56) References Cited

U.S. PATENT DOCUMENTS

| | | |
|---|---|---|
| 2002/0152029 A1 | 10/2002 | Sainthuile et al. |
| 2006/0253254 A1 | 11/2006 | Herwitz |
| 2009/0316755 A1 | 12/2009 | Collette et al. |
| 2017/0045884 A1 | 2/2017 | Kabloui |

FOREIGN PATENT DOCUMENTS

| | | | |
|---|---|---|---|
| EP | 2138921 A2 * | 12/2009 | ........... G05D 1/0022 |
| EP | 2458399 A1 | 5/2012 | |

OTHER PUBLICATIONS

S. Ramasamy et al., "A unified approach to cooperative and non-cooperative Sense-and-Avoid", 2015 International Conference on Unmanned Aircraft Systems (ICUAS), Denver, CO, USA, 2015, pp. 765-773, doi: 10.1109/ICUAS.2015.7152360.

T. Cho, "Automatic Dependent Surveillance - Broadcast for surveillance of Unmanned Aircraft System", 2017 Integrated Communications, Navigation and Surveillance Conference (ICNS), Herndon, VA, USA, 2017, pp. 4C2-1-4C2-8, doi: 10.1109/ICNSURV.2017.8011925.

* cited by examiner

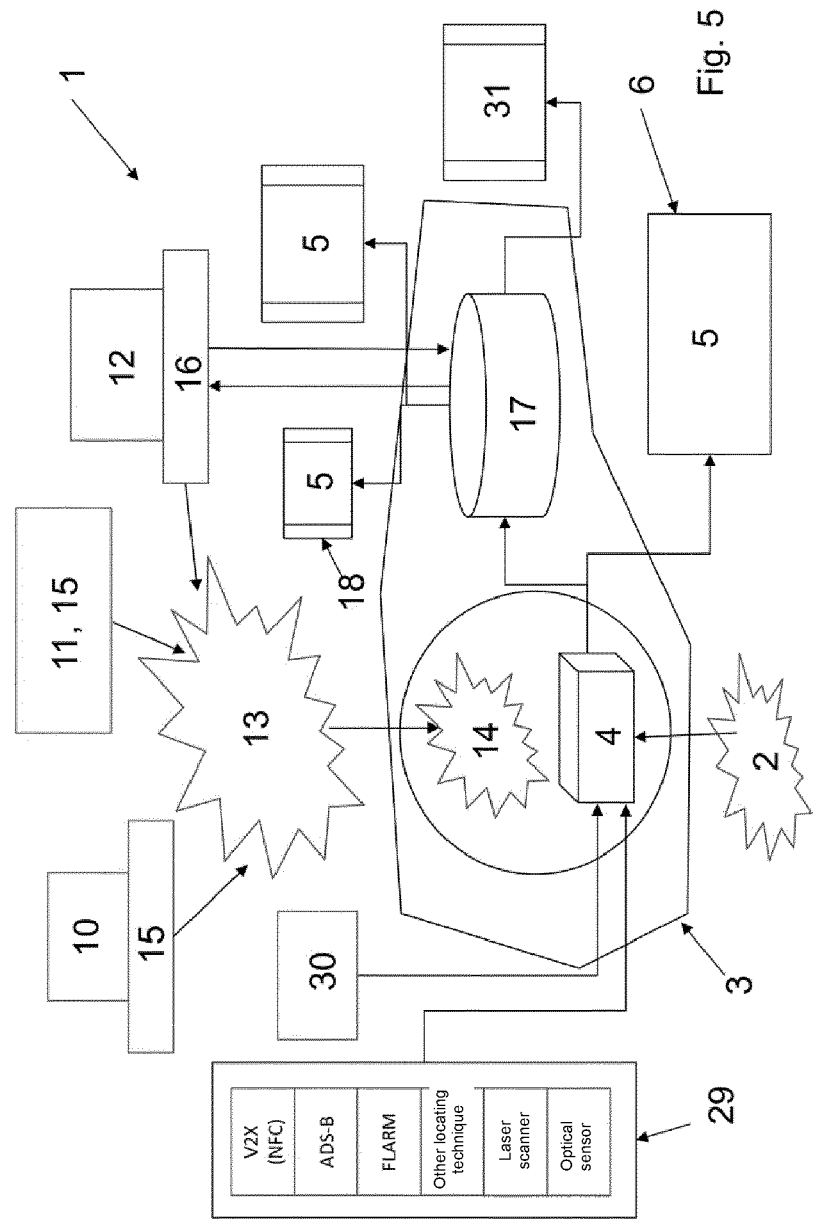

AIR POSITION INFORMATION AND TRAFFIC MANAGEMENT SYSTEM FOR UNMANNED AND MANNED AIRCRAFT

CROSS REFERENCE TO RELATED APPLICATIONS

This application is a National Phase of PCT Patent Application No. PCT/EP2019/055407 having International filing date of Mar. 5, 2019, which claims the benefit of priority from German Patent Application No. DE102018105045.3, filed Mar. 6, 2018. The contents of the above applications are all incorporated by reference as if fully set forth herein in their entirety.

The invention describes an air position information and traffic management system for unmanned and manned aircraft (constituting a variant of the UTM system), in which the position data of (in particular manned) aircraft that are detectable by ATM sensors are detected, tracked, and represented in an air position image by means of ATM sensors of the air position information and traffic management system, and the position data of unmanned aircraft are likewise detected, tracked, and represented by means of further components described below. The air position image provides an air traffic control system or an air traffic controller, for example, with an overview of the airspace in particular of the manned aircraft. ATM sensors as air traffic management sensors are stationary sensors that recognize and locate flying objects in the airspace and are operated by an air traffic control system, for example. As stationary sensors, the ATM sensors in particular are not fixed to the aircraft or moved with it. ATM sensors may in particular be radar sensors. The ATM sensors are connected to a data network (in particular of an air traffic control system or some other central evaluation unit), and upload their determined position data into the data network. Provided in the data network is a tracking device that is configured to track the detected position data and prepare the data as an air position image, so that the air position image may be represented on a display device that is connectable to the data network.

This type of airspace monitoring is used in the monitoring of manned aircraft, wherein manned aircraft are considered to be aircraft controlled by a pilot in the aircraft itself, such as airplanes and helicopters, for example. In contrast, unmanned aircraft or flying objects are aircraft in which no pilot is on board, and in which, for example, passengers may also travel (for example, remote-controlled drones and also drone taxis). It is not possible to locate, or reliably locate, these unmanned aircraft via the ATM sensors used. The same applies for manned aircraft, such as small sport aircraft or light aircraft, that travel in the lower airspace. Nevertheless, points of contact between unmonitored aircraft and monitored aircraft continually occur, in particular in the vicinity of airports.

Against this background, the object of the invention is to provide, within the scope of an air position information and traffic management system, a shared air position image for manned and unmanned aircraft (in the sense of aircraft that are detectable by ATM sensors and aircraft that are not detectable by ATM sensors), to allow possible points of contact of such unmanned aircraft with manned aircraft to be systematically taken into account in traffic management.

This object is achieved according to the invention by an air position information and traffic management system of the type mentioned at the outset, having the features of claim 1. In particular, it is provided that aircraft that are not detectable by means of ATM sensors (these are in particular unmanned flying objects, i.e., not controlled by a pilot in the aircraft, such as drones, or undetected manned flying objects in the lower airspace which, for example, cannot be scanned by means of the radar ATM sensors) are equipped with a portable position sensor device of the air position information and traffic management system, the portable position sensor device being configured to detect current position data. Advantageous embodiments of these position sensor devices proposed according to the invention are so-called hook-in, hook-on, or carry-on devices, explained in greater detail below. The position sensor device proposed according to the invention has a radio communication device that is configured to communicate with a ground station that is connected to the data network and to upload the position data of the position sensor device into the data network. The tracking device of the air position information and traffic management system is also configured to track the position data of the portable position sensor devices and prepare the data as an air position image, so that the air position image may be represented on a display device that is connectable to the data network.

The invention thus expands the known method for detecting, tracking, and representing positions of manned flying objects, based on radar data, to the detection of unmanned flying objects (within the scope of the present disclosure, used synonymously with "unmanned aircraft"), based on position data which in one preferred embodiment of the invention are provided via a mobile radio infrastructure in a data network, and these data are supplied to form a shared air position representation. The novel air position information and traffic management system is thus used for the integrated management of manned and unmanned aircraft, in particular to also avoid collisions between the same and to ensure that air traffic control objectives are met.

According to one refinement of the air position information and traffic management system proposed according to the invention, the tracking device may be configured to combine the position data of the ATM sensors and the position data of the portable position sensor devices, and to create (for example, dynamically in each case, i.e., updated with position data newly uploaded into the data network) a shared air position image for aircraft that are detectable by ATM sensors and aircraft that are not detectable by ATM sensors (thus, in particular manned and unmanned aircraft).

It may be provided that an air position image or various air position images, possibly also prepared with different content, may be represented on a display device, the display device being integrated into the data network or representable in the data network with the aid of a presentation server on, for example, Internet-based (mobile or stationary) presentation clients that are connected to the presentation server. The representation in the display device which is integrated into the data network may also take place on an Internet-based presentation client.

These types of display devices may be integrated into air traffic controller workstations, integrated into mobile display units (for example, smart phones or tablets) that are carried by the pilot in an aircraft or by a remote-controlling pilot outside an aircraft, or designed as an analysis display for a maintenance engineer for inspecting the measurement and tracking quality.

In the integration and preparation of the different position data and the representation of the flight trajectories in air position images, according to the invention expectation windows with regard to the projected flight path in relation to the flight dynamics of the flying object may be taken into account. For typically dynamically inert manned flying objects, these expectation windows are represented in the mathematical form of an ellipse, due to the fact that the main direction of movement for these manned flying objects is not spontaneously changeable. In contrast, for typically dynamically active unmanned flying objects such as drones, these expectation windows are represented as a circle. These forms are taken into consideration when calculating the position data and preparing the data for the air position images.

According to the invention, one or more of the following pieces of information may be represented in the air position image:

positions with position information concerning operations of manned and/or unmanned flying objects (or of aircraft that are detectable by means of ATM sensors and/or aircraft that are not detectable by means of ATM sensors). One air position image that is important according to the invention represents the combined air position image of manned and unmanned aircraft (or aircraft that are detectable by means of ATM sensors and aircraft that are not detectable by means of ATM sensors), i.e., an air position image in which the position data, detected in various ways, are fused.

dynamically updated flight tracks provided with labels (for example, with the type of aircraft, an identifier or a flight number, the geometric and/or barometric altitude information, the state of charge of the battery of an unmanned aircraft such as a drone, the control status (automatic or manual control), or similar additional information concerning an unmanned and/or manned aircraft), wherein dots and/or dashed lines in the flight tracks represent the past flight path, an arrowhead symbol represents the current flight position, and a solid line as a future vector represents the current direction and speed.

spatial-temporal conflicts with static, dynamic, and temporary georegions (geofences or geocages) that are determined based on the created air position image.

spatial-temporal conflicts between unmanned aircraft (in the sense of aircraft whose position data are not detectable by means of ATM sensors; this also includes pilot-controlled aircraft in the lower air spaces that are not systematically detectable by radar ATM sensors, for example), as well as between manned and unmanned aircraft (in each case including warnings and/or alarms, for example concerning distances from aircraft or time periods until possible collisions) that are determined based on the created air position image.

a freely selectable background map (for example, a topographical map or the like) on which the flight trajectories or tracks or flight tracks may be represented.

control positions with position information concerning operations of unmanned flying objects.

According to one preferred refinement according to the invention, the position data uploaded into the data network may include further surveillance data concerning the type and/or status of the aircraft, such as type information for manned or unmanned aircraft, a flight or identification number, geometric and/or barometric altitude information, the state of charge of the battery of an unmanned aircraft such as a drone, the control status (automatic or manual control), or similar information which according to the invention may be detected and transmitted by the position sensor devices or tapped from the onboard system of the aircraft.

The aircraft which are not detectable by means of ATM sensors may in particular be unmanned flying objects (in particular drones) in which no pilot is on board, or manned aircraft in lower air spaces that are controlled by a pilot but not systematically detected by ATM sensors. The latter in particular concern smaller sport aircraft, light aircraft, hang gliders, or the like.

According to the invention, at least a portion of the aircraft that is not detectable by means of ATM sensors may have, as a position sensor device, an autonomously operating device with its own power supply, which together with the aircraft forms a structural unit but is not in communication connection with the aircraft. In this case, the position sensor device collects the position data and possibly further surveillance data based on dedicated sensors installed in the position sensor device and/or dedicated presettings. Such devices are designed as autonomous, independently operational components that are fixed to the structure of the preferably unmanned aircraft, such as a drone, so that they form a unit. For example, they may be accommodated in the housing of the aircraft as a separate unit, or fixed thereto from the outside. These types of autonomously operating position sensor devices are also referred to herein as hook-on devices.

In addition, according to the invention at least a portion of the aircraft that is not detectable by means of ATM sensors may have, as a position sensor device, an autonomously operating device with its own power supply, which as an application (app) is integrated into a mobile terminal together with a processor and communication unit, and may be executed in the mobile terminal. Such a mobile terminal may be, for example, a smart phone, tablet, notebook, or similar communication device which has sensors for a global navigation satellite system (GNSS) and on which an app is installed that carries out the described method, in particular detects the position data of the device, and via the communication unit establishes a connection with the data network in order to upload the position data into the network. In this case as well, the communication takes place in the customary manner via mobile communication. These types of mobile position sensor devices are also referred to herein as carry-on devices. An important characteristic of the mobile position sensor device is that, for example, the pilot may carry and use such a device without it being connected to the aircraft.

A further option according to the invention for providing position sensor devices is for at least a portion of the aircraft that is not detectable by means of ATM sensors to have, as a position sensor device, a device that is electrically and/or electronically connectable to the onboard electrical system of the aircraft, and that is connectable to the control electronics system and/or power supply thereof (and connected during operation). In this case as well, the position sensor device collects the position data and possibly further surveillance data. This may then take place based on dedicated sensors installed in the position sensor device and/or by connection to sensors that are present in the onboard electrical system and addressable by the position sensor device, or data that are retrievable in the onboard electrical system. Such devices are not designed as autonomous, independently operational components, but, rather, function only in conjunction with a state that is connected to the onboard electrical system of the aircraft; i.e., the functioning of the position sensor device is ensured only when it is connected to the onboard electrical system of the aircraft. For this purpose, according to the invention an appropriately configured interface with access to the onboard electrical system is provided in the position sensor device. Such position sensor devices that are integrated into the onboard electrical system of the aircraft are referred to as hook-in devices.

In contrast, devices that are connectable, via a standardized current interface, to a power supply of the aircraft for charging accumulators, and otherwise have no access to the onboard electrical system, are hook-on devices or carry-on devices according to the above definition. The terms "position sensor device" and "hook-on device", "hook-in device," and "carry-on device" are understood to be synonymous.

Via this established interface with a hook-in device, the position sensor device may also access radio communication devices, present in the aircraft, for transmitting the position data. Within the meaning of the present disclosure, the access and use of the aircraft's own radio communication device are also to be understood to mean that the position measuring device has a radio communication device that can transmit data to the data network, even if the position sensor device has no (integrated) radio communication device; instead, the position measuring device accesses or must access the radio communication device of the aircraft.

The interface with the onboard electrical system of the aircraft may have a wired or wireless design. A Bluetooth or NFC communication, for example, may be used as a wireless interface. Such an interface may also be utilized by carry-on devices or hook-on devices in order to read out additional surveillance data from the aircraft, even if the position sensor device in this regard operates autonomously, since according to the invention it has a position sensor integrated into the position sensor device and a radio communication device integrated into the position sensor device.

The air position information and traffic management system according to the invention selectively operates together with any type of hook-in device, hook-on device, and/or carry-on device. The design of these devices is not part of the subject matter of the invention, although their incorporation into the data network provided by an air traffic control system, for example, and the tracking device contained therein is part of the subject matter.

According to one aspect of the air position information and traffic management system that is particularly preferred according to the invention, the radio communication device may be a mobile radio device or satellite communication device. Such a radio communication device may, for example, be a mobile radio communication device that is already integrated into many mobile electronic devices, or that is provided as integratable modules for numerous devices. The communication processing may then also take place, for example, via an Internet of Things (IoT) system with an appropriate communication protocol.

Alternatively or additionally, according to the invention other radio communication devices may be used which allow communication with the data network. These may, for example, be integrated into radio remote controls of drones or of other unmanned aircraft (remote-controlled by a pilot) or flying objects in general, and, for example, via the control signals of the aircraft (in a separate channel, for example) the position signals of the aircraft may be transmitted to the radio remote control, which then, for example in the sense of a carry-on device, uploads these data into the data network via a mobile radio connection, for example. In this case, the position measuring device according to the invention is formed jointly by the radio remote control and position sensors in the remote-controlled aircraft.

An alternative or additionally provided radio communication device may also be an ADS-B radio transmission, in which a configured broadcast transmission of the position data and optionally further data takes place on the 1090 MHz frequency. Data that are prepared by the air traffic control system may also be emitted in a broadcast process and received in appropriately configured aircraft. It is optionally possible to also utilize the similar "FLARM" concept for communication, which, however, allows only a comparatively short-range communication and more preferably functions as a collision warning device.

According to one preferred embodiment, the radio communication device allows bidirectional communication, with forward communication from the position measuring device into the data network, and reverse communication from the data network to the position sensor device. According to the invention, forward communication and reverse communication may take place on different radio channels.

According to the invention, in a reverse communication from the data network to the position sensor device, an intervention in the flight control may also be provided (in particular for unmanned aircraft). This applies in particular for the above-described hook-in devices, which are directly connected to the onboard system of the aircraft, or by means of a remote control in which flight control functions may be accessed in the remote control device.

By means of a safety net calculation in the data network, in which possible collisions of aircraft are detected and an evasion calculation is carried out, within the scope of the reverse communication it is thus possible, using the hook-in device or via communication with a remote pilot station (RPS) that is connected to the flight control of the unmanned aircraft, to achieve or ensure automatic control of the unmanned flying object for the purpose of conflict avoidance by changing a segment of the flight route.

According to one preferred variant of the invention, the position sensor device determines the position data via a global navigation satellite system (GNSS).

Alternatively, but preferably additionally, in principle the position sensor device may determine the position data from data of sensors that are connected to the onboard electrical system of the aircraft. This may take place, for example, via laser scanners or geographic markers in virtually stored maps in conjunction with optical sensors (for example, digital cameras) and triangulation methods, known per se, for position determination.

Thus, by means of the air position information and traffic management system proposed according to the invention, data may be provided for conflict-free flight mission planning with respect to obstacles, no-fly zones, weather conditions, and other planned flight missions, and their processing by authorized bodies may be made possible. From a technical standpoint, processing may also involve flight prioritization. In addition, current data for the flight operation may be checked and appropriate warnings may be provided to the pilot, and there is even the option for intervention in the control system of the unmanned flying object or aircraft.

Further advantages, features, and application options result from the following description of exemplary embodiments and the drawings. All described features, alone or in any arbitrary combination, constitute the subject matter of the present invention, also regardless of their recapitulation in the claims or their back-references.

In the figures:

FIG. 5 is a schematic system overview of an air position information and traffic management system for aircraft according to the present invention, according to a second, enhanced embodiment.

FIG. 1 shows one exemplary embodiment of an air position information and traffic management system 1 according to the invention for aircraft in a design by way of example, with optional components that are necessary and practical for the invention.

Figure 1:
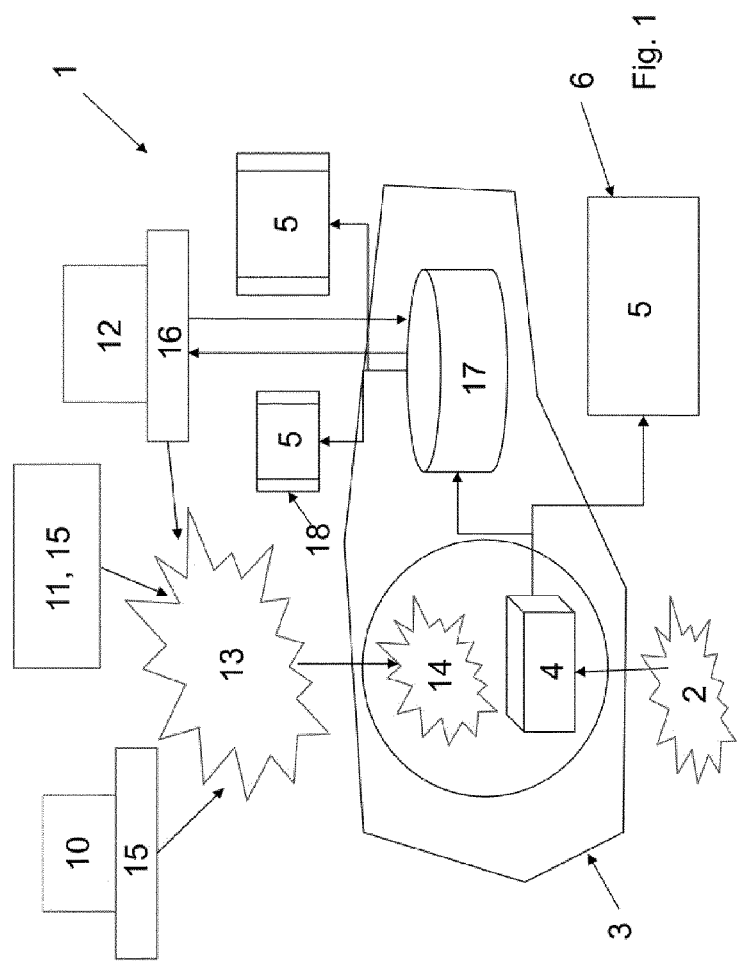
FIG. 1 is a schematic system overview of an air position information and traffic management system for aircraft according to the present invention, according to a first embodiment.

Within the scope of a customary air traffic control ATC of an air traffic control system, position data of (typically manned) aircraft that are detectable by ATM sensors 2 are detected by means of ATM sensors 2 of the air position information and traffic management system 1. Air traffic management (ATM) sensors 2 are stationary sensors that detect and locate aircraft in the airspace and are operated, for example, by an air traffic control system. ATM sensors 2 may in particular be radar sensors.

The ATM sensors 2 are connected to a data network 3 (in particular of an air traffic control system or some other central evaluation unit), and upload their determined position data into the data network 3. Provided in the data network 3 is a tracking device 4 that is configured to track the detected position data and prepare the data as an air position image 5, so that the air position image 5 may be represented on a display device that is connectable to the data network. In other words, the position data delivered by the ATM sensors are tracked and represented in the air position image 5. The air position image 5 determined from the data of the ATM sensors 2 provides an air traffic control system or an air traffic controller, for example, with an overview of the airspace in particular of the manned aircraft. This is customary within the scope of the air traffic control in air traffic control systems.

To also allow aircraft that are unmanned or not detectable by the ATM sensors to be detected within the scope of the air traffic control, these sensors are equipped with portable position sensor devices 10, 11, 12 of the air position information and traffic management system 1, the portable position sensor devices 10, 11, 12 being configured to detect current position data. Possible embodiments of these position sensor devices proposed according to the invention may be designed as a so-called hook-in device 10, hook-on device 11, or carry-on device 12.

The position sensor devices 10, 11, 12 proposed according to the invention have a radio communication device that is configured to communicate, via a radio network 13 that is preferably designed as a mobile radio communications network, with a ground station 14 that is connected to the data network 3 and to upload the position data of the position sensor devices 10, 11, 12 into the data network 3. The tracking device 4 of the air position information and traffic management system 1 is also configured to track the position data of the portable position sensor devices 10, 11, 12 and prepare the data as an air position image 5, so that the air position image may be represented on a display device 6 that is connectable to the data network. The tracking device 4 may particularly preferably be configured to combine the position data of the ATM sensors 2 and the position data of the portable position sensor devices 10, 11, 12, and to create (for example, dynamically in each case, i.e., updated with position data newly uploaded into the data network 3) a shared air position image 5 for aircraft that are detectable by ATM sensors and aircraft that are not detectable by ATM sensors (thus, in particular manned and unmanned aircraft whose position data are detected by the position sensor devices 10, 11, 12).

In the exemplary embodiment of the present invention described here, unmanned aircraft or flying objects, also referred to as an unmanned aircraft system (UAS), are equipped either with a so-called hook-on device as a position sensor device 10 or with a so-called hook-in device as a position sensor device 10. The unmanned aircraft may in particular be drones 15. In the following discussion, the term "drone" is also used synonymously for aircraft that are unmanned and/or not detectable by ATM sensors.

These position sensor devices 10, 11, which are carried by the drone 15 or integrated, are used for data exchange between the drone 15 and a traffic management system for unmanned flying objects (UTM) on the ground.

A hook-on device 10 operates independently of the electronics system of the drone 15, and has no connection to the drone's flight control. As a position sensor, the hook-on device has a global navigation satellite system (GNSS) receiver and a dedicated power supply, and establishes radio contact with the ground station completely autonomously. The hook-on device transmits the data that are generated and detected during flight, in particular the position data of the GNSS receiver, to the ground station 14 over mobile frequencies, i.e., the mobile radio communications network 13. Likewise, data may also be transmitted to other drones 15 via mobile radio. The detection of the position data is not carried out by means of radar as in manned aviation, for example, but, rather, via the mobile radio communications network 13 and with the aid of GNSS data from the position sensor devices 10, 11, 12.

In the so-called hook-in device 11, the device is integrated into the electronics system of the drone 15 and is connected to the drone's flight control and power supply.

Likewise, so-called carry-on devices 12 may be included for the air position information and traffic management system 1 described in the invention. A carry-on-device is a mobile terminal (for example, a smart phone, tablet, or the like) with a software application (app) that represents a client for the UTM system, and emits position data after log-in, identification, and activation. This may also take place via the mobile radio communications network 13. This carry-on device 12 is carried by an aircraft pilot 16, for example, who controls, for example according to visual flight rules, an aircraft that is not detectable by ATM sensors 12.

This app is carried, for example, by a visual flight rules (VFR) pilot during use, and may be installed on a smart phone or tablet of the pilot. Thus, the use of these carry-on devices makes the aircraft with carry-on devices 12 visible to one another and also relative to unmanned flying objects, as well as to the pilot himself.

The position data are transmitted, using the app, from the smart phone of the pilot via the mobile radio communications network 13 to the ground station 14 and to the tracking device 4. The GNSS signals determined by the smart phone are then calculated to form an air position image 5 with other aircraft that are detectable by ATM sensors 2 as well as aircraft that are not detectable by ATM sensors 2. With the aid of a presentation server 17 (which may be part of the UTM system) in the data network 3, the air position image 5 may be represented, example, on Internet-based (mobile or stationary) presentation clients that are connected to the presentation server 17. Such presentation clients may, for example, be the app of the tablet or smart phone as the mobile terminal 18 of the aircraft pilot 16, and may transmit the air position image 5.

Likewise, a remote-controlling pilot of a drone 15 may obtain this air position image 5 on a suitable terminal 19 as a display device, which may be, for example, a remote control device for the drone 15 or a smart phone or tablet that is configured with a suitable app. By using the carry-on device 12, the aircraft pilot 16, for example a VFR pilot, who is required to perform a last-minute maneuver may avoid possible collisions by means of the air position image 5 on his mobile terminal 18.

The air position information and traffic management system 1 described in the invention expands the conventional tracking of manned aircraft in controlled airspace to the tracking and display of unmanned aircraft, such as drones 15, which typically are characterized by greater agility and lower inertia compared to manned aircraft. The conventional methods using radar data detection by ATM sensors 2 are not suitable for integrating agile aircraft, such as drones 15 in particular, that have rapid changes in direction. Likewise, low-flying unmanned or manned aircraft cannot be detected by radar. Furthermore, unmanned flying objects without additional transmitters are not detected. The integration of the data is achieved by the air position information and traffic management system proposed according to the invention.

In order to detect drones 15 and similar unmanned aircraft and integrate them into an air position image 5 according to the invention, with the present invention the method, known per se, of an interacting multiple model (IMM) Kalman filter has been expanded into an air position information and traffic management system 1 for manned and unmanned aircraft, which accordingly may also be referred to as a drone and aircraft surveillance tracking system (DASTS). The hook-on devices 10 and hook-in devices 11, necessary for the integration method and carried by unmanned aircraft, as well as the carry-on devices 12 in manned aircraft which for other reasons are not detectable by ATM sensors 2, are thus an integral part of the system as position sensor devices 10, 11, 12 for collecting position data.

As described above, such position sensor devices 10, 11, 12 connect, via the mobile radio communications network 13 of a telecommunications provider, to the data network 3 of the air traffic control system or dial into same in order to address connected, network-compatible components. Data, in particular the position data or further surveillance data, that are detected by the position sensor devices 10, 11, 12 are thus input into the data network 3, in which these data are relayed to the tracking device 4. The tracking device 4 uses the transmitted position data 20 of the flying objects, compensates for measuring errors, time errors, temporal bulking (temporal stretching or increase in volume), or gaps by means of the IMM filter (to be explained below), and then calculates a track position for generating an air position image 5, which may also be referred to as "situational awareness." A calculated movement, made up of the target course and ground speed, is thus created from the data plots of the position sensor devices 10, 11, 12.

An extended collision risk and possible alarms as well as safety clearances may be determined by integrating these data into the tracks, based on the radar data and optionally other surveillance data of manned flying objects detected by ATM sensors 2. This takes place in a representation of a dynamically updated air position image 5 of the fused data of manned aircraft, and unmanned aircraft, in particular drones 15, provided with position sensor devices 10, 11, 12.

Figure 2:
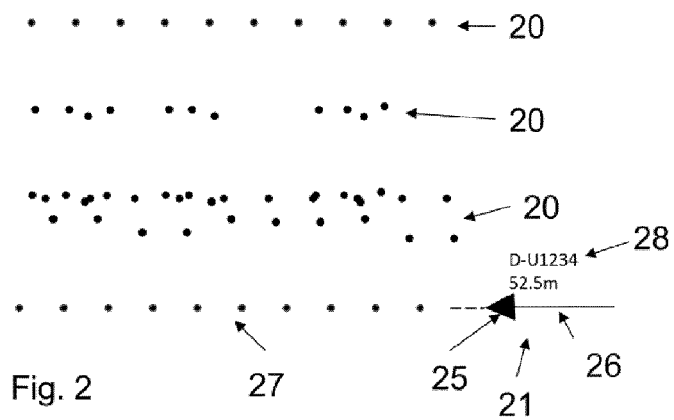
FIG. 2 shows an example of a plot and a flight trajectory that are tracked based on position data.

As illustrated in FIG. 2, according to the invention the position data 20 of the ATM sensors 2 and of the position sensor devices 10, 11, 12 are depicted as plots representing the time sequence of the position data 20, in order to extract therefrom the flight trajectory 21 (track) of the aircraft. The tracking device 4 has an enhanced interacting multiple model (IMM) Kalman filter that uses different motion models, turning flight, straight flight, standstill, and in particular higher-dynamics motion data, optionally as a function of the data channel, for modeling the movements of unmanned flying objects.

Figure 3:
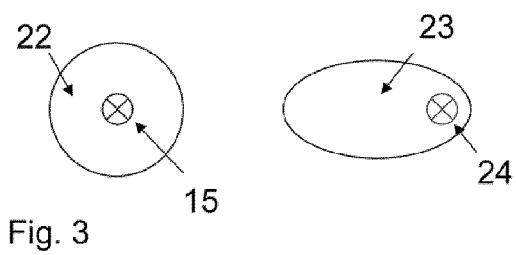
FIG. 3 is an illustration by way of example of expectation windows for manned and unmanned aircraft.

In a statistical risk assessment, the tracking device 4 takes into account in particular the greater agility of drones 15 and unmanned flying objects in general, and may assign appropriately adapted safety clearances that are determined from expectation windows 22, 23. Thus, for example, for typically more inert manned flying objects such as airplanes 24, ellipsoids with distortion of longitudinal movement are used in the calculation as an expectation window 23 (see FIG. 3). For agile unmanned flying objects such as drones 15, circular ellipsoids are used as the expectation window 22. The air position information and traffic management system assesses the flight trajectories 21 (tracks) of the individual aircraft by paired comparison to one another, using the expectation windows 22, 23 in circles and ellipses around the aircraft 15, 24 in order to indicate potential conflicts and provide recommendations for track control.

In the paired comparison of the tracks of the flying objects, the air position information and traffic management system carries out "octal tree" sorting around the particular track position. The comparison of all track positions takes into account all incoming data of the flying objects, i.e., in addition to the radar data, in particular the kinematic data of the unmanned flying objects via the position sensor devices 10, 11, 12, such as speed, GNSS position, acceleration, course, and variances. From this information, the air position information and traffic management system determines an expectation window 22, 23 for the future movement in order to make the risk assessment possible.

In this way, typical movement characteristics may be respectively associated with manned and unmanned aircraft.

As illustrated in FIG. 2, arrowhead symbols 25 for the tracks 21 show the current flight position. A future vector 26 shows the direction and contains the speed. The past flight tracks of the flight trajectory 21 are described in an air position image 5 by use of so-called history dots 27, and thus indicate the past flight path.

On the representation of the air position image 5, the illustrated unmanned aircraft are provided with labels 28 that contain geometric and barometric altitude information. The arrowhead symbol 25 of the track of the unmanned flying object may also contain data from further sensors of the unmanned flying object. This may be, for example, the state of charge of the battery, control statuses, or telemetry data. Maintenance engineers may have information concerning the measurement and tracking quality displayed on an additional analysis display.

Figure 4:
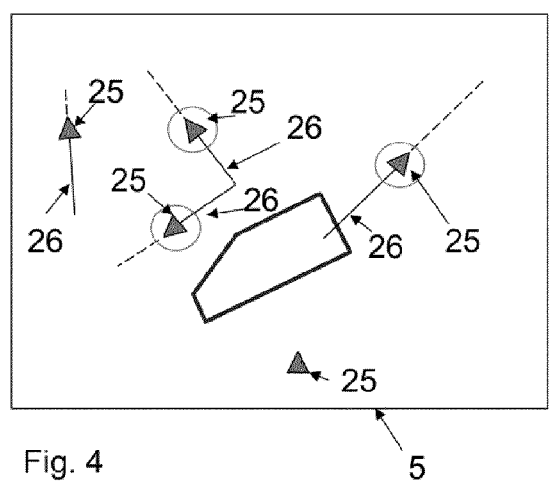
FIG. 4 is an illustration by way of example of an air position image having various flight trajectories.

As illustrated in FIG. 4, in an air position image 5 shown here by way of example, the operator likewise obtains information and warnings about possible collisions. The air position information and traffic management system provides the pilot of an unmanned drone 5, for example, with such an air position image 5 containing risk assessment and alarm functionality for all aircraft or flying objects present in the airspace. The same information is also available to operators, optionally staff of regulatory and safety authorities, and optionally air traffic controllers.

Depending on the particular user, the air position images 5 may be prepared differently and may have a different representation.

The representation of the aggregated data on the display device 6, 18, 19 may take place against the backdrop of selectable maps.

As illustrated in a further embodiment of the air position information and traffic management system 1 according to the invention in FIG. 5, having further optional features, other (preferably optional) communication and locating techniques 29 may be used in addition to the functionalities already described. The information transmission from the position sensor devices 10, 11, 12 takes place via mobile communication. Satellite communication, IoT communication, NFC communication, ADS-B, or FLARM may also be optionally used, as described above.

Likewise, other locating techniques such as via laser scanners or geographic markers in virtually stored maps in conjunction with optical sensors in triangulation methods for detecting unmanned aircraft (drones 15) may be integrated. Corresponding plots of position data 20 and tracks 21 may also be delivered by drone detection systems 30 (DDS) for so-called uncooperative flying objects. Thus, additional information concerning activities of unmanned aircraft or flying objects (such as drones 15, for example) in the immediate surroundings of airports in different critical regions, depending on the risk level, may be provided to an air traffic controller, for example at an airport control tower.

Likewise, critical infrastructures, test tracks, industrial facilities, correctional facilities, etc., may thus be monitored for the flyover of unmanned flying objects. The air position image 31 thus created for a drone detection then shows, for example, spatial-temporal conflicts with such defined static, dynamic, and temporary geofences and geocages (georegion). This is possible due to the fact that the air position information and traffic management system, via the data fusion with the assistance of covariance intersection, allows assessment of the cooperativeness of unmanned flying objects (such as drones 15).

For an intervention, in drones 15 with a hook in-device 11 the air position information and traffic management system, via a control signal that may be transmitted over a separate data channel, may allow direct intervention in the flight control of a drone 15 or unmanned aircraft. This is likewise possible via direct communication with a radio remote control of the drone 15 on the ground, with takeover of, or interventions in, the control of the drone 15. Thus, when a drone 15 or an unmanned flying object penetrates a critical overflight region, a handover of the control by the pilot of the unmanned flying object may be made to the air position information and traffic management system, and for example an automatic takeover of the control may take place or a change in the segment of the flight route may then be made.

The air position information and traffic management system proposed according to the invention in general provides the mission planning of unmanned flying objects with information concerning obstacles, no-fly zones, weather conditions, and other authorized flight missions. This allows the operator or pilot to perform the flight prioritization and/or the planning of control interventions in the mission of the unmanned aircraft based on more accurate information, or even to automate same (in the future).

LIST OF REFERENCE NUMERALS

1 air position information and traffic management system
2 ATM sensors
3 data network
4 tracking device
5 air position image
6 display device that is connectable to the data network
10 position sensor device as a hook-on device
11 position sensor device as a hook-in device
12 position sensor device as a carry-on device
13 radio network, in particular mobile radio communications network
14 ground station
15 drones
16 aircraft pilot
17 presentation server
18 mobile terminal as a display device
19 terminal as a display device
20 position data
21 flight trajectory or track
21 expectation window for a drone
22 expectation window for an airplane
23 airplane
24 arrowhead symbol
26 future vector
27 history dots
28 label
29 optional communication and locating techniques
30 drone detection systems
31 air position image for drone detection

The invention claimed is:

1. Air position information and traffic management system for unmanned and manned aircraft, in which position data of aircraft that are detectable by air traffic management (ATM) sensors are detected, tracked, and represented in an air position image by means of ATM sensors of the air position information and traffic management system, wherein the ATM sensors are stationary sensors that are not carried on board the aircraft, and that recognize and locate aircraft in the airspace, wherein the ATM sensors are connected to a data network provided by an air traffic control system and upload the position data of a recognized aircraft into the data network, wherein provided in the data network is a tracking device that is configured to track the position data uploaded by the ATM sensors and prepare the position data as an air position image, so that the air position image is represented on a display device that is connectable to the data network, wherein aircraft that are not detectable by means of ATM sensors are equipped with a portable position sensor device of the air position information and traffic management system, the portable position sensor device being configured to detect position data of the aircraft equipped with the portable position sensor device, wherein the position sensor device has a radio communication device that is configured to communicate with a ground station that is connected to the data network and to upload the position data into the data network, said radio communication device being a mobile radio communication device that is configured to communicate, via a radio network that is designed as a mobile radio communications network, with a ground station that is connected to the data network and to upload the position data of the position sensor device into the data network, wherein the tracking device is configured to track the position data uploaded by the portable position sensor device and to prepare the position data as an air position image, so that the air position image is represented on the display device that is connectable to the data network, wherein the tracking device is configured to combine the position data of the ATM sensors and the position data of the portable position sensor device, and to create a shared air position image for aircraft that are detectable by ATM sensors and aircraft that are not detectable by ATM sensors, in said air position image the position data of the ATM sensors and of the position sensor device are depicted as plots representing the time sequence of the position data, in order to extract therefrom the flight trajectory of the aircraft, and wherein said tracking device comprises an Extended Interacting Multiple Model Kalman Filter that uses different motion models, comprising turning flight, straight flight, standstill, and motion data, for modeling the movements of unmanned flying objects and wherein said tracking device is adapted to take into account the greater agility of drones and unmanned flying objects in a statistical risk assessment by assessing the flight trajectories of the individual aircraft by paired comparison to one another, using expectation windows for future movement to enable risk assessment for indicating potential conflicts, wherein ellipsoids with a longitudinal distortion along the movement direction of the aircraft are used for a calculation of the expectation windows of airplanes as inert manned flying objects, and wherein circular ellipsoids are used for a calculation of the expectation windows of drones as agile unmanned flying objects, and wherein said tracking device is adapted to assign safety clearances for the aircraft that are determined from said expectation windows.

2. The air position information and traffic management system of claim 1, wherein an air position image is represented on a display device, the display device accessing the data network.

3. The air position information and traffic management system of claim 2, wherein the display device is integrated into the data network, or is connected to the data network by accessing a presentation server, integrated into the data network, as a presentation client.

4. The air position information and traffic management system according to claim 1, wherein one or more of the following pieces of information is represented in the air position image:

positions with position information concerning operations of manned and/or unmanned aircraft;

dynamically updated flight tracks provided with labels, wherein dots and/or dashed lines in the flight tracks represent the past flight path, an arrowhead symbol represents the current flight position, and a solid line as a future vector represents the current direction and speed;

spatial-temporal conflicts with static, dynamic, and temporary georegions that are determined based on the air position image;

spatial-temporal conflicts between unmanned aircraft as well as between manned and unmanned aircraft that are determined based on the created air position image;

a freely selectable background map;

control positions with position information concerning operations of unmanned flying objects.

5. The air position information and traffic management system according to claim 1, wherein the position data uploaded into the data network include further surveillance data concerning the type and/or status of the aircraft.

6. The air position information and traffic management system according to claim 1, wherein the aircraft which are not detectable by means of ATM sensors are unmanned aircraft in which no pilot is on board.

7. The air position information and traffic management system according claim 1, wherein aircraft that are not detectable by means of ATM sensors have, as a position sensor device, an autonomously operating device with its own power supply, which together with the aircraft forms a structural unit but is not in communication connection with the aircraft.

8. The air position information and traffic management system according to claim 1, wherein aircraft that are not detectable by means of ATM sensors have, as a position sensor device, an autonomously operating device with its own power supply, which as an application integrated into a mobile terminal together with a processor and communication unit, and is executed on the mobile terminal.

9. The air position information and traffic management system according to claim 1, wherein aircraft that are not detectable by means of ATM sensors have, as a position sensor device, a device that is electrically and/or electronically connectable to the onboard electrical system of the aircraft, and that is connectable to the control electronics system and/or power supply thereof.

10. The air position information and traffic management system according to claim 1, wherein the radio communication device is a mobile radio device.

11. The air position information and traffic management system according to claim 1, wherein the radio communication device allows bidirectional communication, with forward communication from the position measuring device into the data network, and reverse communication from the data network to the position sensor device.

12. The air position information and traffic management system according to claim 11 wherein in a reverse communication from the data network to the position sensor device, an intervention in the flight control is also provided.

13. The air position information and traffic management system according to claim 1, wherein the position sensor device determines the position data via a global navigation satellite system.

14. The air position information and traffic management system according to claim 1, wherein the position sensor device determines the position data from data of sensors that are connected to the onboard electrical system of the aircraft.

* * * * *